United States Patent Office 3,448,271
Patented June 3, 1969

3,448,271

OBJECT TRACKING AND IMAGING SYSTEM HAVING ERROR SIGNAL DURATION PROPORTIONAL TO OFF-CENTER DISTANCE

Douglas H. Aldrich, Vestal, Richard F. Bombard, Endwell, Doyle C. Gibbs, Owego, and Robert J. Orrange, Vestal, N.Y., assignors to International Business Machines Corporation, Armonk, N.Y., a corporation of New York Filed Sept. 21, 1965, Ser. No. 488,863
Int. Cl. G01j *1/20*
U.S. Cl. 250—203 18 Claims

ABSTRACT OF THE DISCLOSURE

A star or sun tracker for nominally centering acquired celestial images on the face of a vidicon tube and digitally reading out their X and Y coordinates to a computer. Cycled counters generate deflection signals for the tube scan and the coordinates of all encountered images are fed to a logic section by stopping the counters and reading out their values. In the stellar mode, the logic section determines whether an image is being viewed in superimposed wide or narrow fields of view, or both, ignores any image signals due to the presence of undesired stars, and generates gimbal drive signals to center the desired star image on the tube face. In the solar mode, the logic section generates gimbal drive signals to center the outline of the solar disk within the narrow viewing field and read out the X and Y thicknesses of the annular ring between the edges of the field and the disk to the computer.

Figure 1:
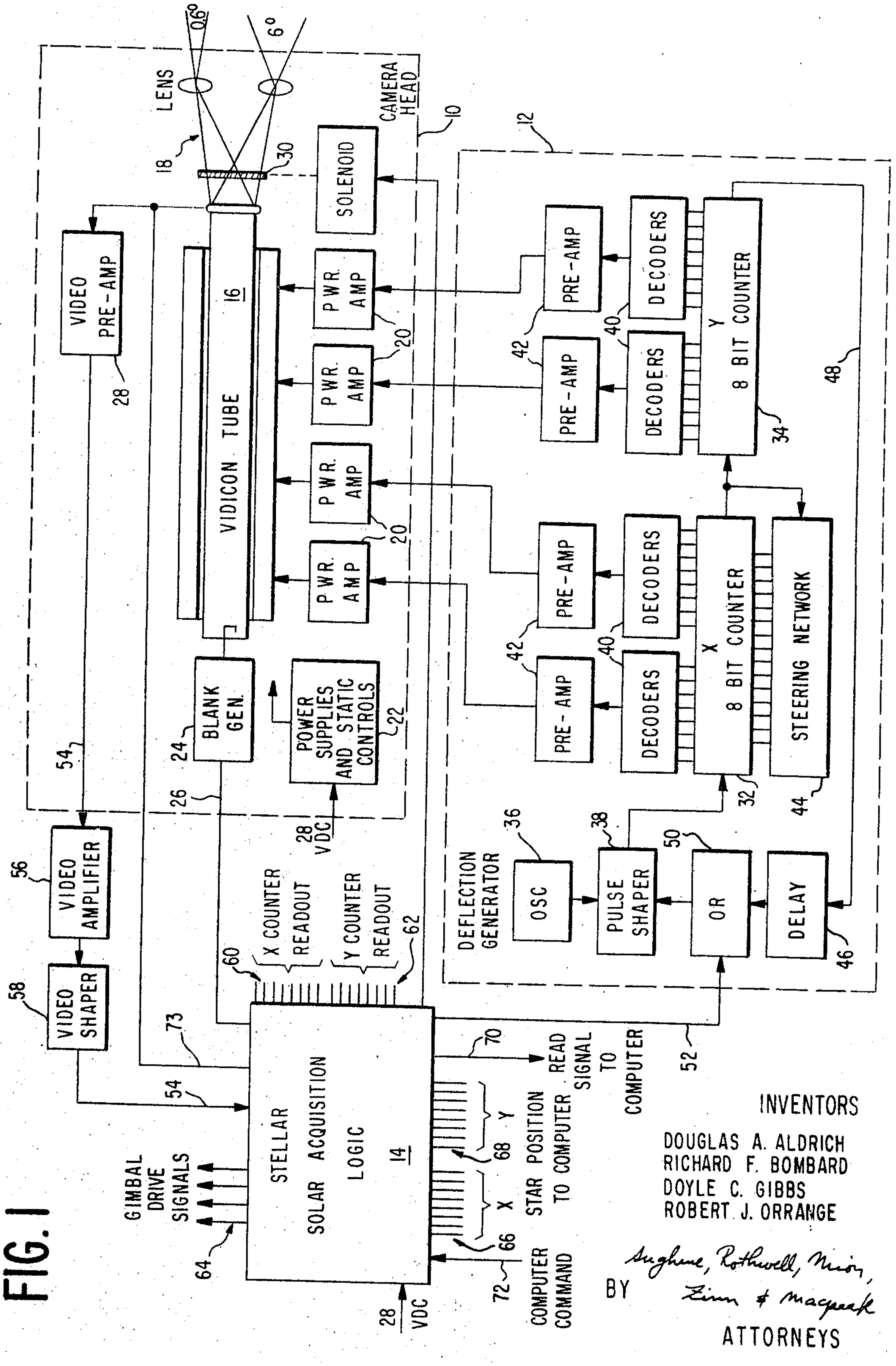

This invention relates in general to an object tracking system and more particularly to a novel celestial body tracker which advantageously employs a two channel optical system having both wide and narrow fields of view, a digital scanning system for detecting and reading out images focused on the face of a vidicon tube and a logic implemented electronic system for handling and processing such images. The invention is especially concerned with the organization of the electronic system and the functioning thereof the effect the centering of desired images on the vidicon tube face and the readout of their digital coordinates to a utilization device.

With the advent of self-sustained guided missiles and space vehicles numerous problems have arisen relating to the accurate navigation and guidance systems required by such carriers. Owing to the difficulties encountered in establishing and maintaining reliable communications between the carriers and earth stations as well as the possibility of adverse interference, such as by enemy jamming or due to extraneous noise signals present in the atmosphere, the developmental emphasis in this area has been toward self-contained navigation systems which are substantially independent of ground control or commands.

Since any navigational problem must inherently be resolved with respect to a fixed reference point or position, the heavenly bodies, i.e., the sun and stars, whose polar coordinates with respect to the earth are well known at any given instant, offer a convenient source of such reference points. In order to utilize a particular celestial body as a navigational reference for a rapidly moving space vehicle, for example, it becomes necessary to accurately determine the angular position of the selected body with respect to the vehicle, i.e., the angle between the axis of the vehicle and the line of sight from the vehicle to the celestial body. Furthermore, in most self-contained celestial navigation systems position computations are made on a continuous, or at least a rapidly intermittent, basis, and it therefore becomes necessary to continuously make the aforesaid angular determination. This invention provides a unique star tracking apparatus for performing this essential function which is particularly, although by no means exclusively, adapted to be used in a self-contained celestial navigation system.

The star trackers of the prior art have generally employed a single channel optical system with a relatively small or narrow viewing field, usually subtending an angle of less than one degree. Although a small viewing field is advantageous from the standpoint of achieving high angular resolution once the image is acquired, it necessarily requires very accurate initial pointing in order to bring the desired star reference within the field of view. If the initial pointing error is larger than the field of view, which is almost always the case with narrow field trackers, a gimbal scanning mode must be provided to effect the acquisition of the selected star within the optical field. Narrow field star trackers suffer from the further disadvantages that: (1) they are unable to distinguish between the images of a desired star and that of an undesired or ambiguous star that may exist in close proximity to the desired star, and (2) they are usually of the null-seeking type and require very accurate gimbal drives in order to achieve high pointing accuracies.

The prior art star trackers that employ large viewing fields, on the other hand, are characterized by poor angular resolution and the inability to select and lock on the reference star when one or more ambiguous stars are also present within the field of view.

The star tracking apparatus of this invention successfully overcomes the above described disadvantages attendant with the prior art systems by providing a dual channel optical system having both wide and narrow fields of view, thus obtaining the desirable features of each type while avoiding their individual drawbacks. The images of both optical channels are superimposed upon each other and focused on the face of a single vidicon tube provided with a digital scanning capability, and by such a technique the dependency of the system accuracy upon the gimbal drive is obviated. Logic networks are also provided for enabling the apparatus to track either a selected distant star or the sun. In the former mode the logic serves to resolve any ambiguities that may develop when one or more extraneous stars, as well as the desired star, are within the viewing fields, while in the latter mode the logic provides gimbal drive signals to nominally center the image of the sun within the narrow field of view. While these logic networks are particularly adapted to a star tracking environment their overall image processing and handling techniques are generally applicable to any type of beam scanning operation, such as is widely employed in character recognition systems, industrial process control systems, etc. and the invention is therefore not limited in its scope to the preferred embodiment thereof disclosed herein.

It is, accordingly, a primary object of this invention to provide a novel star tracking apparatus adapted for either stellar or solar modes of operation.

It is further an object of this invention to provide such an apparatus which advantageously employs a dual channel optical system having both wide and narrow fields of view, and in which the images of both fields are superimposed upon each other and focused on the face of a single vidicon tube.

It is a further object of this invention to provide such an apparatus in which the vidicon tube is provided with a digital scanning capability which enables the direct and accurate readout of all images within the optical fields of view, thereby obviating the need for accurate and costly gimbal drive mechanisms and avoiding the inherent disadvantages associated with null-seeking star trackers.

It is a further object of this invention to provide such an apparatus which includes special logic networks for controlling the optical sensing and scanning functions and for processing received stellar and solar images. These logic networks, which operate in conjunction with a computer embodied in the apparatus using the star tracker, serve to center selected stellar images and implement the resolution of any possible ambiguities that may develop when extraneous stars are present within the viewing fields in the stellar mode, and they also provide gimbal drive signals for locating the sun image in the approximate center of the narrow field of view when in the solar mode. Such logic networks further implement an accurate vernier readout of the center of the sun once the latter has itself been centered in the narrow viewing field.

It is a further object of this invention to provide electronic logic means for handling and processing optical images represented by electrical signals derived from a beam scanning apparatus.

It is a further object of this invention to provide such logic means which are particularly designed to generate drive signals for nominally centering detected optical images with respect to the scanning apparatus and to implement the resolution of ambiguities when more than one optical image is detected.

Figures 2, 4:
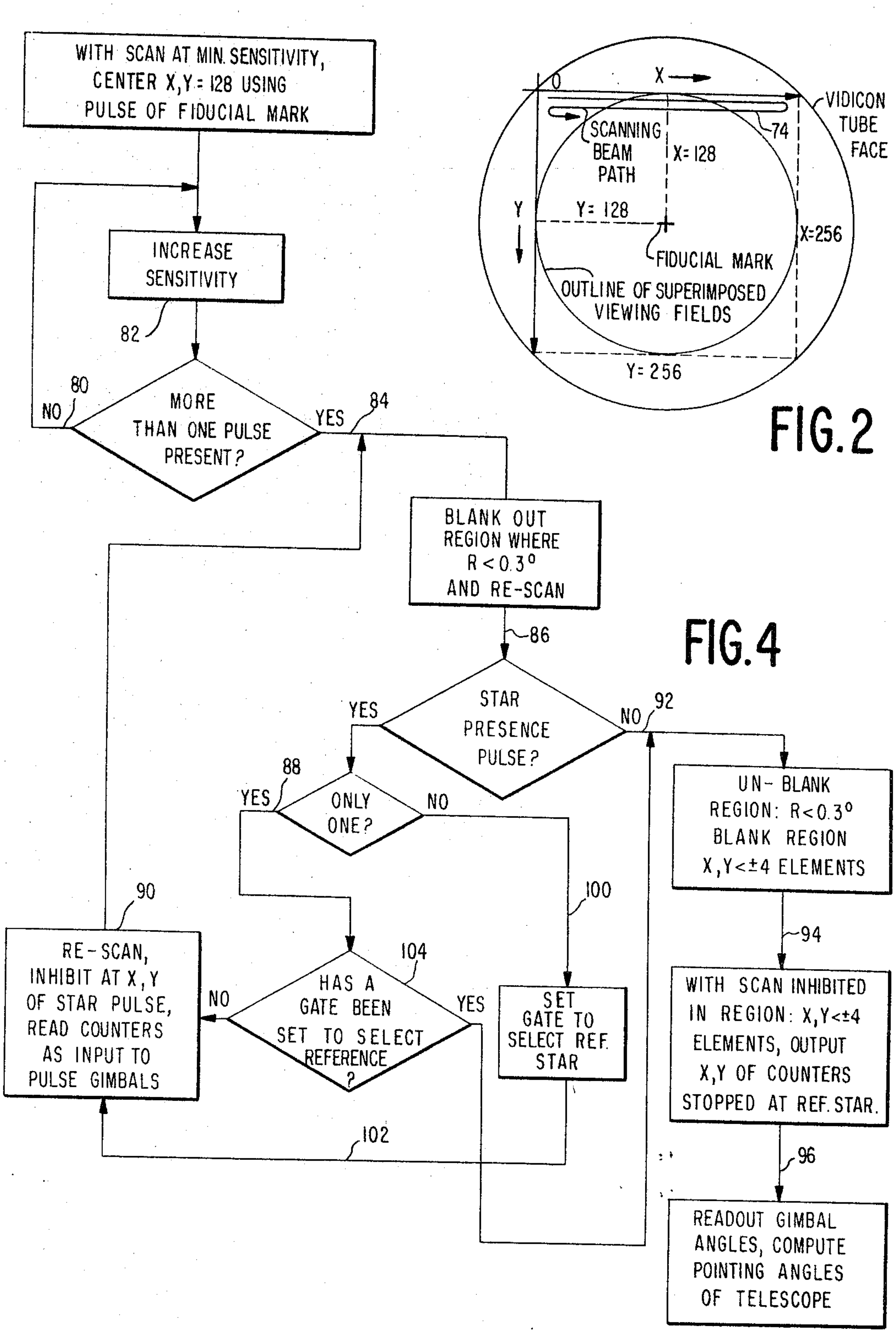
Figure 3A:
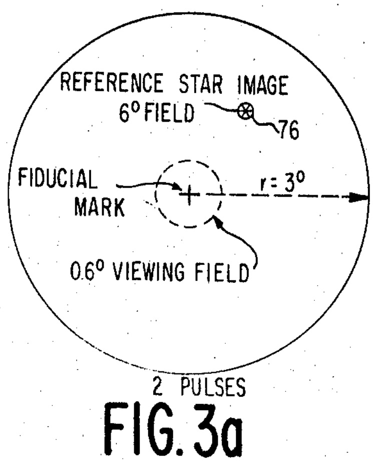
Figure 3B:
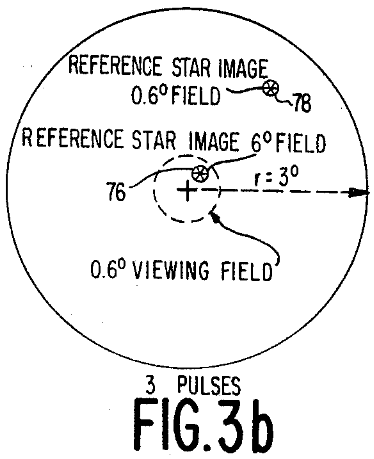
Figure 5A:
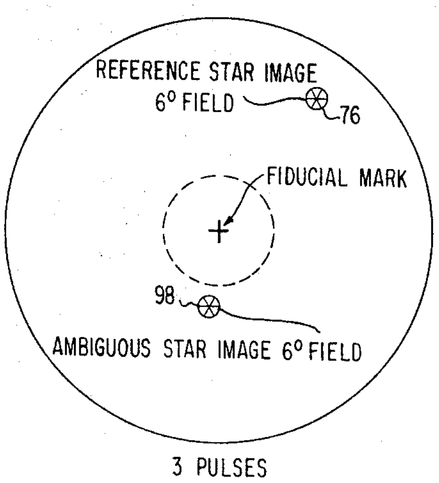
Figure 5B:
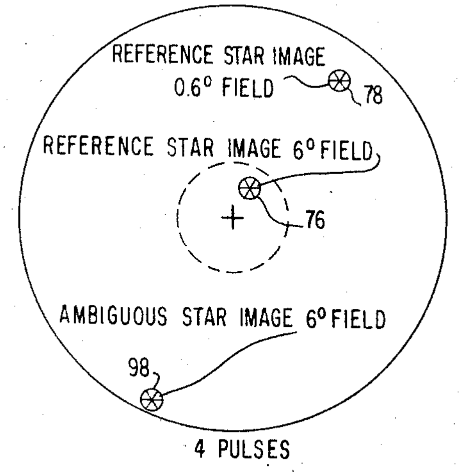
Figure 5C:
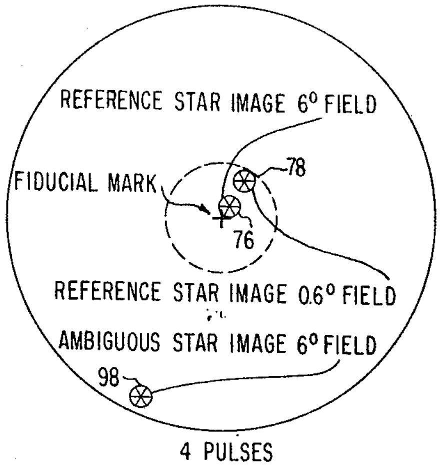
Figure 6:
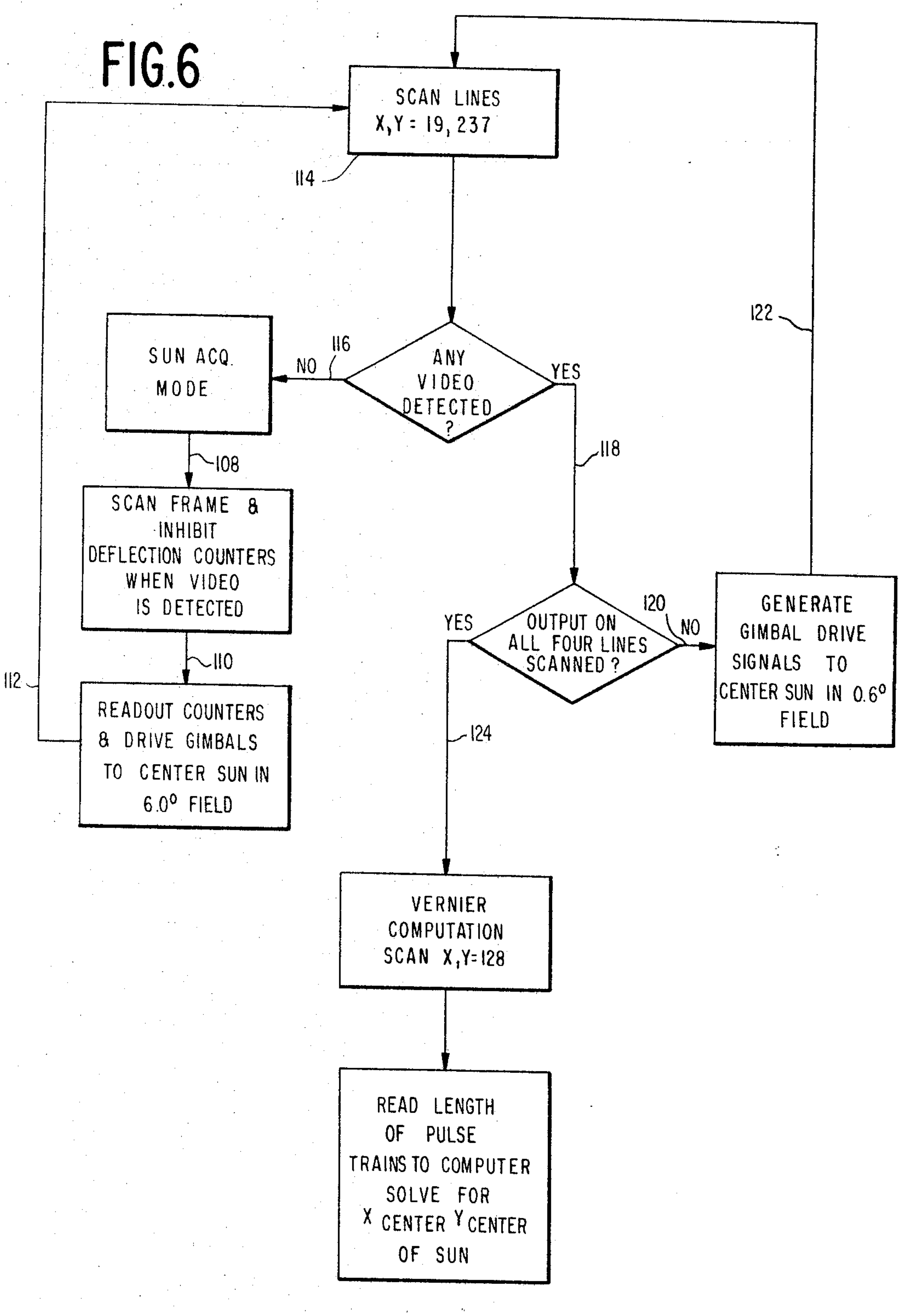
Figures 7A, 7B, 7C, 7D:
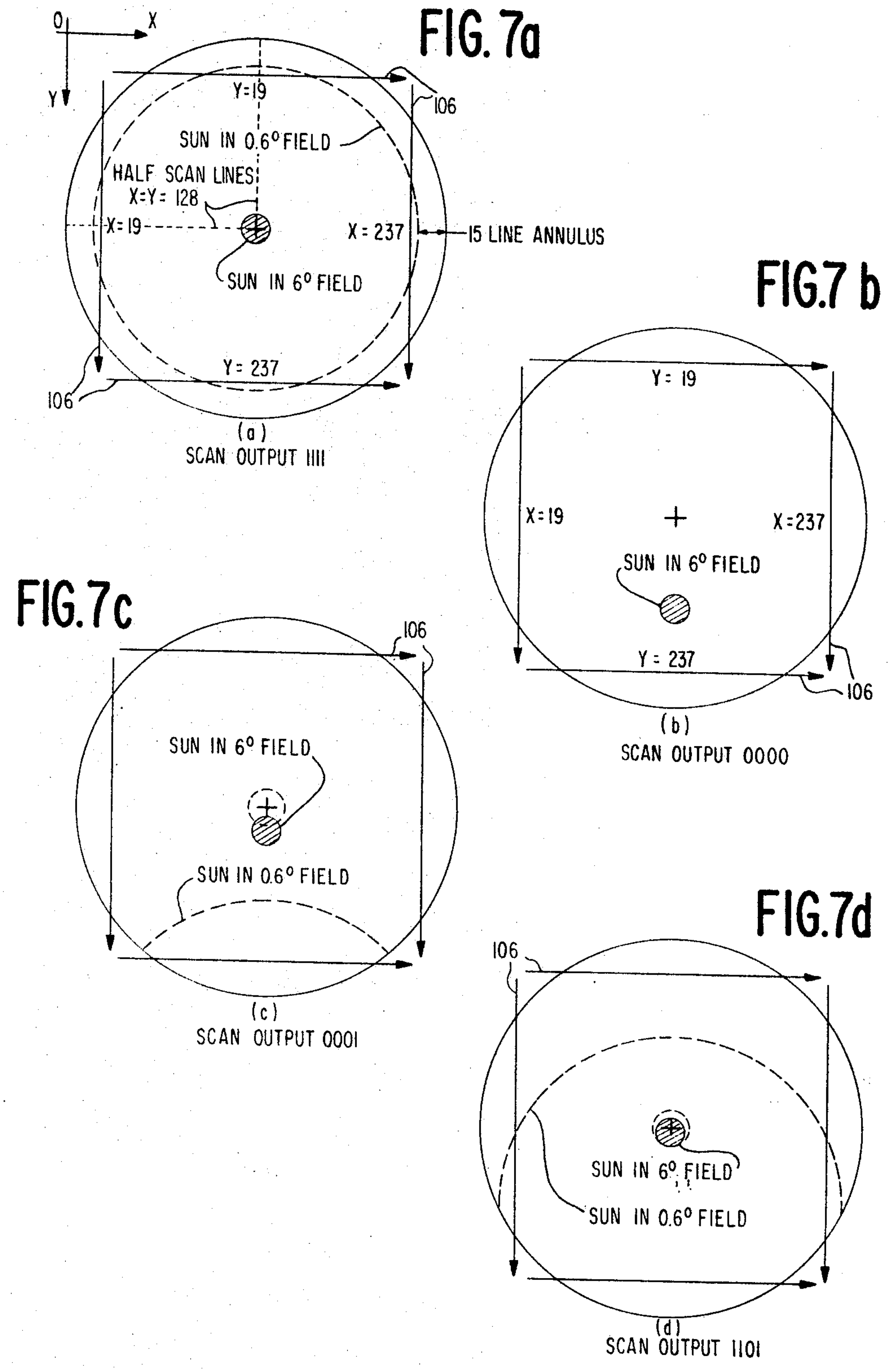
Figure 8:
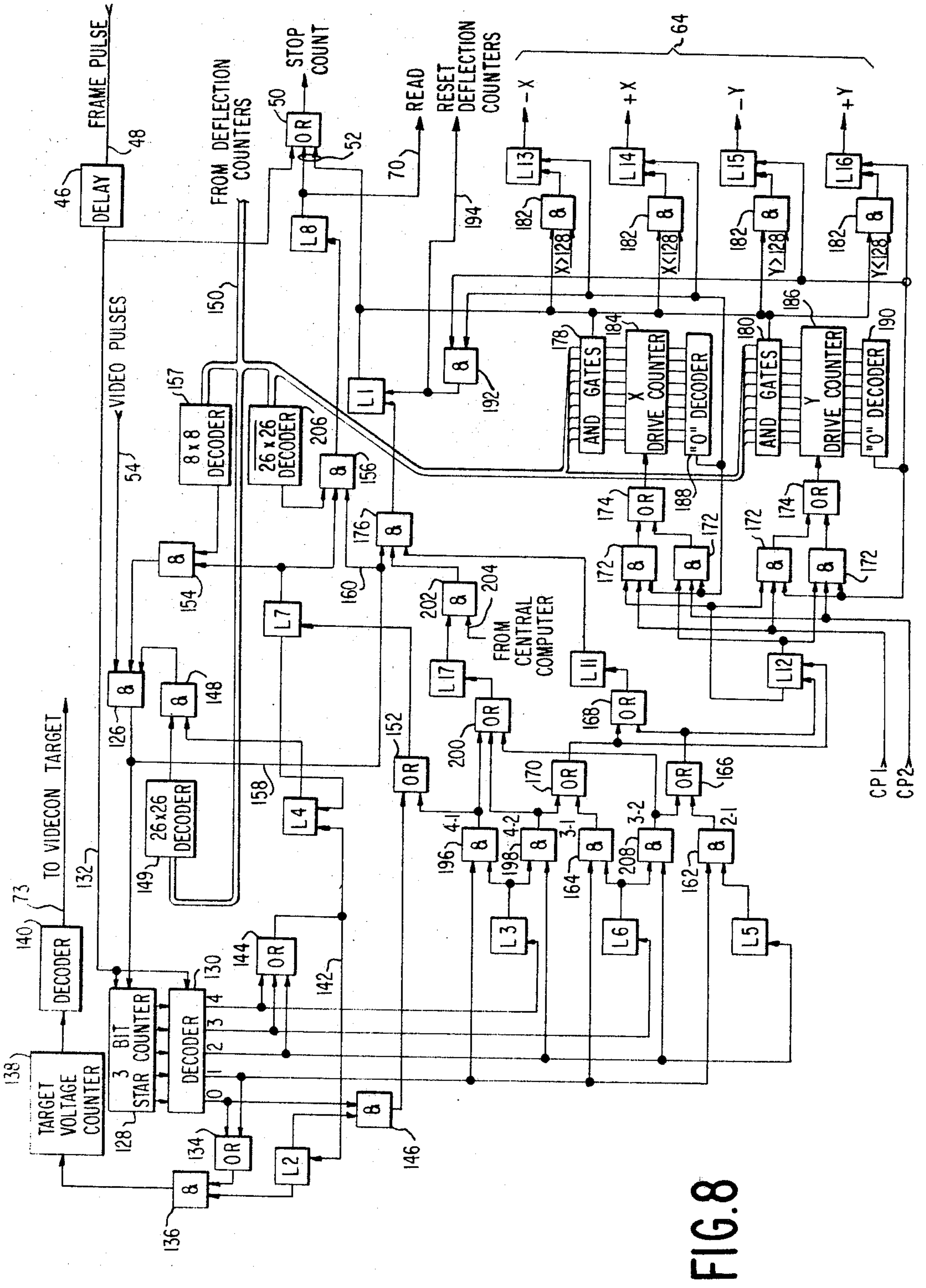
Figure 9:
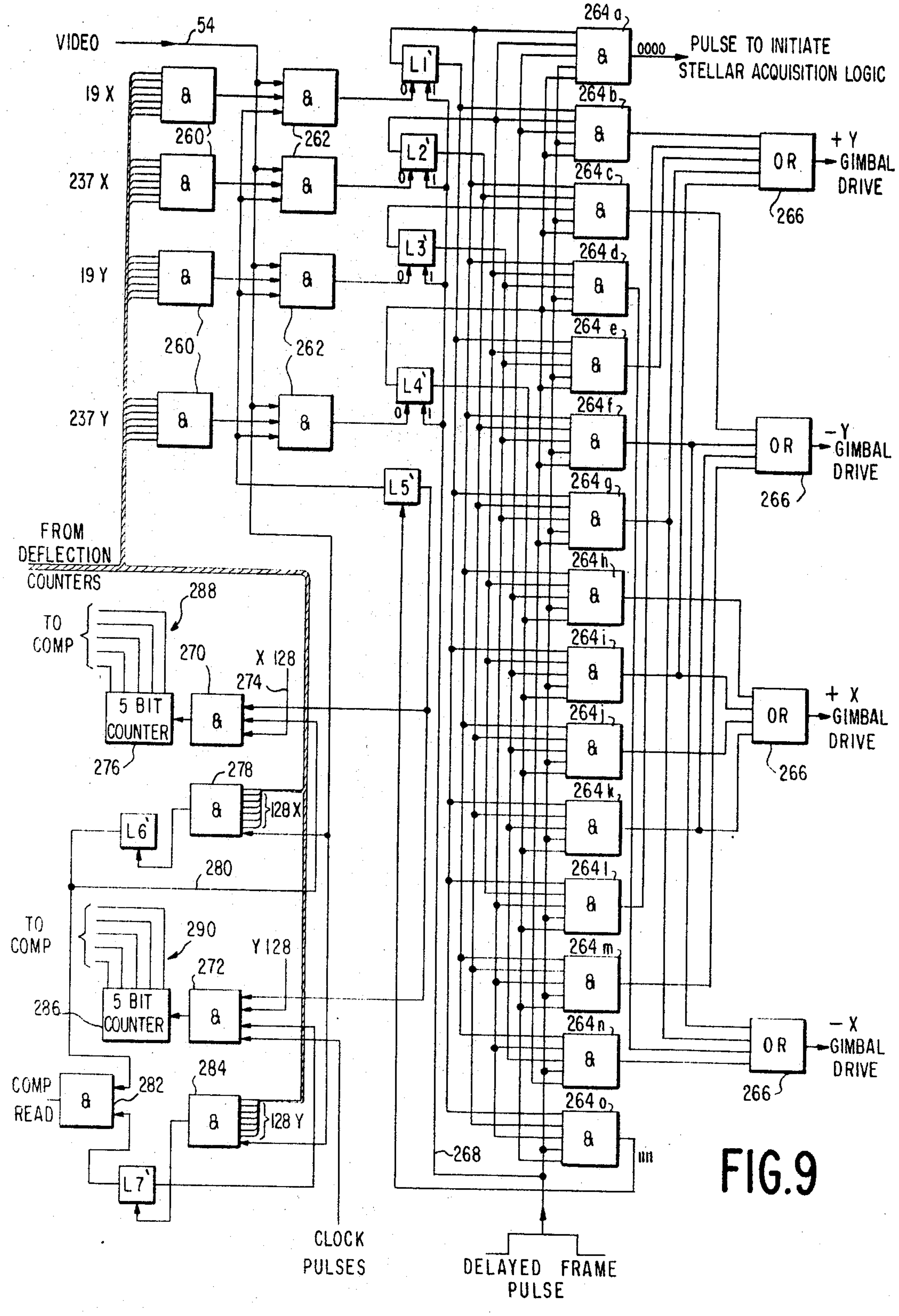

These and further objects and advantages of this invention will become apparent to those skilled in the art upon a consideration of the following detailed description of a preferred embodiment of the invention taken in conjunction with the accompanying drawings, in which:

FIGURE 1 shows a schematic block diagram of the overall star tracking apparatus of this invention, including the dual channel optical system and vidicon sensing tube, the digital scanning means and the logic networks, FIGURE 2 shows the face of the vidicon tube with certain explanatory designations thereon, FIGURES 3*a* and 3*b* show possible image configurations for the stellar mode when only the reference star image is present, FIGURE 4 shows a logic flow diagram of the operational sequences performed in resolving a selected stellar reference, positioning it within the optical fields of view and reading out its digital coordinates to the computer, FIGURES 5*a*, 5*b* and 5*c* show possible image configurations for the stellar mode when both the reference star image and an ambiguous star image are present, FIGURE 6 shows a logic diagram of the operational sequences performed in acquiring and positioning the image of the sun and in reading out its digital coordinates to the computer, FIGURES 7*a*, 7*b*, 7*c* and 7*d* show possible image configurations of the sun in the wide and narrow fields of view as it is being acquired and centered, FIGURE 8 shows a schematic block diagram of the logic network employed for the stellar mode of operation, and FIGURE 9 shows a schematic block diagram of the logic network employed for the solar mode of operation.

Before proceeding with a detailed description of the invention it will be well to outline several assumptions that have been made concerning the structural environment in which the invention is employed. These assumptions are completely arbitrary and not limiting, and are made by way of example only in order to facilitate a clear and comprehensive understanding of the invention. Thus, it will be assumed that the star tracking apparatus is employed in the navigation system of a powered space vehicle. It will further be assumed that the vehicle includes its own computer and memory sections, an inertial platform and a gimbal driving and angular readout means.

The gimbal driving mechanism may be employed to position the camera head of the vidicon tube, including the dual channel optical system, in response to discrete command signals generated by the logic networks of the star tracking apparatus or by the vehicle computer. The angular readout means associated with the gimbal drive mechanism serves to provide accurate position signals to the computer which describe the polar orientation of the optical axis of the star tracking apparatus with respect to the vehicle axis.

The computer, acting on the basis of attitude information supplied by the inertial platform and star position information supplied by the memory section, calculates the initial pointing angles to which the optical axis must be driven in order to bring a desired stellar or solar reference within the wide field of view, and a comparison of these angles with those derived from the angular readout means enables the generation of the gimbal drive signals necessary to effect such initial point. It is also assumed that the maximum initial pointing error is no greater than $\pm 3.0°$, which is well within the capabilities of most systems of this type. The computer implements the additional functions of resolving stellar ambiguities and performing coordinate transformations to determine the polar orientation of the line of sight to a celestial reference with respect to the vehicle axis. The latter enables the computation of appropriate vehicle steering signals, which is the final product of the navigation system. The resolution of stellar ambiguities is made on the basis of image positions supplied by the star tracking apparatus and known stellar orientation patterns stored in the memory section. In brief, if it is known that an ambiguous star lies to the lower right of a selected reference star and the tracking apparatus detects two star images having such a spatial configuration, the computer determines that the desired star is the one whose image lies in the upper left position of the scan. The actual selection of the reference star is implemented by means of electronic gates in the logic networks of the tracking apparatus, as more fully described below.

Referring now to FIGURE 1, which shows a schematic block diagram of the overall star tracking apparatus, it will be seen that the three principal components of same include a camera head 10, a deflection generator 12 and the stellar/solar acquisition logic 14. The camera head is comprised of a vidicon tube 16, a dual channel optical system 18, power amplifiers 20 for applying the sweep signals to the deflection coils of the vidicon tube, and the necessary power supplies and static or calibration controls 22 for the tube. Also included is a blank generator 24 responsive to the logic section signals over line 26 for turning off the scanning beam during flyback and whenever the scanning operation is stopped, a video preamplifier 28 responsive to output signals generated by the sensitized face of the vidicon tube whenever the scanning beam impinges upon a light image that has been focused on the face of the tube and a solenoid controlled shutter mechanism 30 for shielding the tube face from the optical system when the apparatus is not in use. It will be noted that the wide and narrow fields of view of the optical system are indicated as subtending angles of 6.0° and 0.6°, respectively, and it is to be understood that their optical axes are substantially coincident along the same general line of sight, thus nesting the smaller field within the larger one. The reasoning behind the selection of these particular angles will be presented below. It is also seen that both fields of view have been superimposed upon each other at the viewing end and focused on the face of the vidicon tube, the heights of both fields being the same on the tube face.

The sweep signals for the vidicon tube scanning beam are derived from the deflection generator 12 and they consist essentially of analog voltages converted from the instantaneous diigtal values contained in a pair of 8 bit binary counters 32 and 34. The counters are driven at a clock rate of approximately 250 kilocycles per second by the output from a crystal controlled oscillator 36, the oscillator pulses being shaped first in a gated pulse shaper 38. The instantaneous digital values contained in the two counters are continuously converted to analog form in the decoders 40, strengthened in the preamplifiers 42 and applied to the power amplifiers 20 in the camera head. The counters are connected in series with the overflow pulses from the X counter 32 driving the Y counter 34 to effect the usual X—Y timing relationship. In addition, a steering network 44 is operatively associated with the X counter. The steering network contains a bistable multivibrator and the necessary resistor-diode combinations to effect a count-up count-down action in the X counter, thus implementing a back-and-forth type of X axis sweep in the vidicon tube.

When the Y counter is full, i.e. it has received 256 or $2^8$ pulses, the scanning frame has been completed and a pulse is delivered to the delay unit 46 over line 48. The delay unit is provided to allow sufficient time for the inductive recovery or settling of the deflection coils for the vidicon tube after each flyback, when the scanning beam must be moved a maximum distance from one corner of the tube face to the diametrically opposite corner. The delay unit does not actually delay the entire applied signal, but rather lengthens same or stretches it out so that its effect is more prolonged. The coil recovery time for the incremental movements effected during each complete scanning frame is negligible when operating at a 250 kc. clock rate and therefore no delay need be provided between the successive digital scanning steps. The delay unit action is accomplished by ungating the pulse shaper 38 for approximately 10 microseconds through the OR gate 50, the OR gate also being selectively supplied with a sweep inhibit input over line 52 from the logic section.

The stellar/solar acquisition logic 14, more fully described below in connection with FIGURES 8 and 9, receive input signals from the vidicon tube output over line 54 after appropriate amplification and shaping in the video amplifier 56 and video shaper 58. These signals are in pulse form and indicate the encountering of images focused on the face of the vidicon tube by the scanning beam. If it is desired to read the binary coded diigtal coordinates of such images the logic section momentarily inhibits the sweep by a signal over line 52 and the present status of all eight stages of both the X and Y counters are sensed over line groups 60 and 62, respectively, the complete connections between the counters and the logic section not being shown. The logic section is also provided with four output lines 64 for the ±X, ±Y gimbal drive signals, output lines groups 66 and 68 for conveying digital star position coordinates to the computer, a read signal command line 70 to the computer, a computer command input line 72 and a 28 volt DC power supply line. The line 73 from the logic section to the vidicon tube target line is for effecting sensitivity level changes in the tube detecting circuits. The various components shown in block diagram form in FIGURE 1, such as the vidicon tube, counters, decoders, etc., are well known to those skilled in the electronic arts and may have any one of a number of specific circuit configurations, not essential to the invention.

Before entering into a detailed description of the operation of the star tracking apparatus in both the stellar and solar modes, it may be well to explain the nature of the digital scanning technique employed as well as the reasoning behind the selection of the particular angles for the wide and narrow viewing fields of the optical system. The former may be understood more clearly with reference to FIGURE 2 which shows the face of the vidicon tube with certain explanatory designations thereon. Taking the zero point or origin of the X and Y scanning axes in the upper lefthand corner of the tube face, it will be seen that each axis extends a maximum distance of 256 lines or elements corresponding to the full count values of the deflection counters 32 and 34. With both counters initially set at zero, the first pulse received from the oscillator 36 will more the scanning beam $\frac{1}{256}$ of the scan width along the X axis, the second pulse will place it at $\frac{2}{256}$ of the width, etc. When the X counter has received 256 pulses it has reached its full value and the next pulse overflows into the Y counter, setting the latter at a value of 1 and moving the scanning beam down one element along the Y axis. Due to the count-up count-down action of the X counter caused by the steering network 44, the scanning beam now continues back along the X axis and follows the path indicated by line 74.

After 32,640 pulses (255×128) are received the center of the scan will have been reached at $X=Y=128$, and this point is permanently etsablished for calibration and image handling purposes by burning a fiducial mark in the geometric center of the tube face. Due to the presence of the fiducial mark an apparent star pulse will be detected when the scanning beam is incident thereon. As will be explained below, however, the logic section has been designed to anticipate and compensate for this pulse. The reception of 65,536 pulses (256×256) fills both counters and completes a scanning frame, and the next pulse causes both counters to be reset to zero during the time interval provided by delay unit 46 so that a new frame can be initiated. At the 250 kc. clock rate the stepping pulses from oscillator 36 occur every four microseconds and a complete frame can therefore be scanned in 0.262 second.

As seen in FIGURE 2 the outline of the superimposed viewing fields has been shown as occupying less than the entire surface area of the vidicon tube face. This has been done primarily to facilitate the description of the scanning technique, and in actual practice it may prove more economical to employ a smaller vidicon tube whose face dimensions are more nearly coincident with those of the viewing fields.

As mentioned earlier, the wide and narrow viewing fields have been chosen to subtend angles of 6.0° and 0.6° respectively. The selection of the wide field angle represents a compromise between several factors. First of all, from the viewpoint of acquiring a desired reference star and tolerating a large initial pointing uncertainty, the larger the size of the field the larger the permissive pointing uncertainty. A second factor however, which influences the size of the large viewing field to be selected is the problem of resolving ambiguous star images. The larger the field, the greater the likelihood that stars other than the reference star will be present within the viewing field. This, in turn, complicates the logic necessary to identify the desired reference star in the presence of one or more ambiguous star images. The choice of 6.0° for the size of the wide field thus permits a generous initial pointing uncertainty of ±3.0° and at the same time insures that no more than one ambiguous star will ever be present within the viewing field that has sufficient brightness to be seen on the vidicon.

The angular pointing resolution that may be achieved by the apparatus is determined by both the narrow field angle and the number of scanning lines or elements per frame. To obtain a resolution of 10 arc seconds, which is approximately equal to ±½ of the width of a scanning element with the chosen limitation of 256 lines per frame, it can be shown that the narrow field angle must be less than 0.71°. On the other hand, the apparatus must also function in a solar mode and the sun is known to subtend a diametric arc of 31 minutes 59.26 seconds or 0.533°. Since the pointing angle to the sun will be established by sensing the edges of the solar disc after same is nominally centered within the narrow viewing field, the latter must therefore be larger than 0.533°. The selection of the narrow field angle 0.6° thus represents a choice between these limits.

Turning now to FIGURES 3 and 4 the logical operations or steps performed by the star tracking apparatus in the stellar mode will be outlined for the situation where only the desired reference star is present in the viewing fields. It is to be noted initially that although the optical axes of the wide and narrow fields have been specified as being substantially coincident along the same line of sight, in actual practice they are separated by two or three scanning lines in order to identify the reference star in the respective fields of view. In other words, if the axes were made coincident a precisely centered star image would itself be coincident in both fields and focused at the fiducial mark, thus making it appear that no star images were present. For purposes of explanation, however, both optical axes will be treated as being nominally coincident to more fully develop the concept involved in identifying a reference star.

FIGURE 3*a* shows an outline of the superimposed viewing fields as seen by the face of the vidicon tube with the portion of the wide field that is also seen by the narrow field being indicated by the circular broken line. The radius of the wide field is shown as 3.0° from the center fiducial mark to the circumference, and the image of the reference star in the wide fields is shown at 76. In FIGURE 3*b* the reference star has been more closely centered and now appears in the narrow viewing field as well as at 78. A scan of FIGURE 3*a* would produce two video pulses, one from the star image 76 and the other from the fiducial mark. Similarly, three pulses would be detected in a scan of FIGURE 3*b* since the star image is less than 0.3° from the optical axis of the wide field and is therefore within the viewing angle of the narrow field. The image configuration shown in FIGURE 3*a* will evolve to that of FIGURE 3*b* as the camera head is gimbaled to bring the reference star toward the center of the viewing fields, as more fully developed below.

Referring to the logic flow diagram of FIGURE 4, the process of recognition, centering and readout for the image configurations shown in FIGURE 3 will now be explained. Initially the vidicon tube detecting circuits are set at a minimum level of sensitivity and the center of the scanning frame is taken at X, Y=128, the position of the fiducial mark. It is assumed at this point that the gimbals have been driven by computer commands to effect the desired initial pointing of the camera head, which, owing to the viewing angle of the wide field and the specified pointing accuracy, assures that the reference star will lie somewhere within the wide field of view. The detection of a single video pulse during a scanning frame signifies that only the fiducial mark is being sensed, and the sensitivity of the detecting circuits is therefore increased. This step corresponds to points 80 and 82 in FIGURE 4, and the sensitivity increase continues in a cyclic manner until more than one pulse is detected. The latter situation corresponds to point 84 in the flow diagram. When two or more pulses are thus detected it is known that an image(s) other than that represented by the fiducial mark is present.

In the representation of the wide 6.0° field on the face of the vidicon tube, the narow 0.6° field lies within the area whose diameter is 1/10 that of the wide field and is therefore scanned by 25.6 or approximately 26 lines. If this region, defined by 115<X, Y<114 (13 lines on either side of the center at X, Y=128) is now blanked out, the fiducial mark and any star image within 0.3° of the optical axis of the wide viewing field will not be detected during the next scanning frame. Under these blanking conditions, corresponding to point 86, the detection of a video pulse raises two possibilities. Either the pulse represents the reference star image in the narrow field or it represents the reference star image in the wide field external to the blanked region. The latter corresponds to the image configuration of FIGURE 3*a* while the former case represents the pattern of FIGURE 3*b*. In either event only one pulse will be detected, corresponding to point 88, and the X, Y values of the deflection counters, inhibited at point 90 when the star image is sensed, will be read out to the logic section 14. The latter will then issue appropriate gimbal drive signals to position the star in the center of both optical fields. If the logic was dealing with the configuration of FIGURE 3*a* it would evolve to that of FIGURE 3*b* as the gimbals center the image, and the same logic sequence will still be applied. This cyclic sequence through points 86, 88 and 90 will continue until point 92 is reached at which no star presence pulses are sensed in the area external to the blanked region. The gate selection function between points 88 and 90 applies only to ambiguous star situations and may be ignored for the present.

When point 92 in FIGURE 4 is reached it is known that the reference star image must lie within the coincident center regions of both the wide and narrow fields of view. More specifically, due to the proportionality of the field angles when both fields have the same image height, if the reference star is within 1/10 of the center of the viewing angle of the narrow field it must be within 1/100 of the center of the viewing angle of the wide field, ignoring for the moment the fact that the two fields are not axially coincident. For purposes of optical and electronic linearity, the reference star image has now been positioned sufficiently close to the center of the vidicon tube face to permit the readout of its digital coordinates to the computer. Upon the receipt of such information, along with the gimbal angles, the computer will perform a coordinate transformation to determine the accurate pointing angle to the star with respect to the vehicle axis. Before the image coordinates can be read out the region defined by 115<X, Y<141 must necessarily be unblanked. If this is done, however, a pulse from the fiducial mark and/or a pulse from the reference star image in the wide field, if it has not been superimposed on the fiducial mark, would still be detected if the entire tube face was scanned. To circumvent this problem a second blanking is effected in the center region defined by 124<X, Y<132 or X, Y<±4 elements with respect to the geometric center. A re-scan under these conditions, corresponding to the point 94 on the logic diagram, will now detect only the image of the reference star in the narrow viewing field. When the image is detected the deflection counters are again inhibited and their contents are read out to the computer, as indicated by point 96 in FIGURE 4. This completes the logic sequence followed by the star tracking apparatus in the stellar mode when only the reference star is seen in the viewing field.

In the situation where a second star other than the desired reference star is also present within the wide field of view, it is apparent that additional information is necessary in order to identify the reference star and resolve the ambiguity. FIGURES 5*a*, 5*b* and 5*c* show three possible image configurations, as may be seen by the vidicon tube, where such ambiguous stars are present. In FIGURE 5*a* the reference star image 76 and the ambiguous star image 98 are both within the scope of the wide viewing field, thus giving rise to three video pulses during a scanning frame. FIGURE 5*b* shows the reference star image somewhat more centered and it now appears in both the wide and narrow viewing fields, which would produce four video pulses during a complete, unblanked scan. In FIGURE 5*c* the reference star has been centered in the R<0.03° area of the narrow field, which is analogous to point 92 in FIGURE 4 for the single star situation, and once again four video pulses would be sensed during an unblanked scanning frame.

The method employed for resolving ambiguities in the star tracking apparatus makes use of the fact that the relative positions of two star images in any given pattern will not be interchanged with respect to each other as long as the angular uncertainty about the line of sight is less than 45°. Since the linear and angular initial pointing uncertainty for the apparatus was assumed to be less than 3.0°, the 45° limitation of the resolution technique is easily met. With the possibility of image interchanges thus ruled out, the known patterns of all stars that may be selected as references and that are also within 6.0° of other stars in the galaxy are stored in the memory section of the vehicle. In other words, the positions of each such reference scan with respect to its neighboring ambiguous star are recorded for subsequent use in resolving ambiguities that may develop.

Referring again to FIGURE 4, the star acquisition and initial blanking steps are performed as before up to point 86. When the rescan is accomplished, however, and two video pulses are detected, as would be the case with the image configuration shown in FIGURE 5*a*, the logic proceeds now to point 100 on the flow diagram. At this point a gate is set which allows the processor to enter the logic section which will resolve ambiguities based on present information for this line of sight. The setting of the gating means, corresponding to point 102 in FIGURE 4, causes the scanning beam to be inhibited during the next frame when it encounters either the first or the second star image, whichever one represents the ambiguous star. The logic sequence then proceeds cyclically as before through points 90, 86, 100 and 102 until only one video pulse is detected.

At this stage, corresponding to point 88 in FIGURE 4, it is known that the reference star has been driven into the blanked center region of both viewing fields, as shown in FIGURE 5*c*, and that the single video pulse that was detected can only be due to the presence of the ambiguous star in the wide viewing field. Whereas normally the apparatus would now attempt to drive the ambiguous star image to the center of the scanning frame, this possibility is circumvented by noting, at point 104, whether or not a reference selection gate has been set. If one has been set then the detected star image is known to be that of the ambiguous star, it is simply ignored, and the logic proceeds to point 92. The image configuration shown in FIGURE 5*c* can only develop if the ambiguous star is separated from the reference star by less than 3.0°. If the separation is between 3.0° and 6.0°, the ambiguous star will move out of the wide viewing field as the reference star is driven toward the center. The logic now proceeds as before through points 94 and 96 to supply the computer with the precise digital coordinates of the reference star, from which the aforementioned transformation is again carried out.

The basic approach used by the star tracking apparatus for determining the angular orientation of the line of sight to the sun is to detect the geometric center of the sun. In view of the extreme size of the solar image, however, as compared with any given stellar image, the usual frame scanning technique becomes ineffective once the solar image enters the narrow viewing field. In other words, since the sun with its diametric arc of 0.533° will substantially fill the narrow 0.6° field when centered, the normal frame scan would produce an almost continuous train of video pulses. Under these conditions, no convenient method is available for locating the exact center of the solar image.

The approach taken in the solar mode, therefore, is that of departing from the usual image centering sequence once the sun enters the narrow viewing field and scanning only selected chords of the frame. Actually, the entire frame is always scanned in the back and forth manner previously described, but the logic responds only to video pulses detected when the scanning beam is on the selected chord lines. For simplicity of explanation, however, the scan will be described as being along the chord lines rather than covering the complete frame. Logic is then provided for interpreting the chord scan outputs and generating gimbal drive signals therefrom which will center the solar image in the narrow viewing field to within ±10 scanning lines from the center of the tube face in either direction.

FIGURES 7*a*, 7*b*, 7*c* and 7*d* illustrate some of the possible image configurations for the solar mode, with FIGURE 7*a* representing the final position of the solar image once it has been nominally centered within the narrow viewing field. Since the sun, when exactly centered, will subtend 226 of the 256 scanning lines in both the X and Y directions, it will leave an annular ring having a thickness of 15 lines between the edge of the solar disc and the outline of the viewing fields, as seen in FIGURE 7*a*. The chord lines 106 that will be scanned once the solar image has entered the narrow field have therefore been chosen as X, Y=19, 237, thus assuring intersection with the solar image even when the latter is centered.

It would, of course, be desirable to attempt to exactly center the solar image so that a scan of the four tangent lines at X, Y=15, 241 could be employed. This would, however, require a gimbal drive accuracy to less than ±½ of a scanning line, which is considerably better than the generous limitations specified for the apparatus of 1.5 arc minutes. This limitation corresponds to approximately ±10 scanning lines, and if the tangent lines were scanned under these conditions and a gimbal drive signal was generated, the solar disc could easily overshoot the area boxed in by the tangents. If this happened a gimbal drive signal for the opposite direction would be generated and the apparatus would thus enter a limitless centering or hunting cycle. Consequently, a scan of the four chord lines has been employed to norminally perform the same centering task. A vernier readout mode, described in detail below, is then effected to accurately determine the geometric center of the solar image.

Turning now to FIGURE 6, which shows the logic flow diagram for the solar mode, the initial acquisition steps follow points 108, 110 and 112. These steps are identical to those corresponding to points 80–90 in FIGURE 4 with the exception that after each gimbal drive operation the chord lines are scanned at point 114 to determine whether or not the solar image has been driven into the narrow field of view. If it has not, no video signals will be produced during the chord line scans and the logic will recycle through point 116.

Since the initial pointing uncertainty is limited to ±3.0° the solar image is assured to be somewhere within the wide field of view during the first scan in the acquisition cycle, as shown in FIGURE 7*b*. As soon as the configuration of FIGURE 7*c* is reached a video signal will be produced during the Y=237 chord line scan and the logic exists from the acquisition cycle at point 118. As stated earlier, the chord scan outputs are now interpreted by the logic section and appropriate gimbal drive signals are generated for nominally centering the solar image in the narrow field of view. The positioning sequence would be that shown in FIGURES 7*c*, 7*d* and 7*a*, in that order, and the logic cycle proceeds through points 118, 120, 122 and 114, again in the given order. When video outputs are produced during all four chord line scans the configuration of FIGURE 7*a* has been reached and the logic leaves the centering cycle at point 124.

The vernier readout mode is now entered to determine the precise digital coordinates of the sun's geometric center. Essentially, the half lines X, Y=128 are scanned, as shown in FIGURE 7*a*, and a counter is stepped for each line scan increment during the times when no video pulses are detected, i.e. in the intervals in which the scanning beam is traveling across the annular ring between the edges of the frame and the solar disc. The counting is inhibited whenever video signals are detected. Since the annular ring would be 15 lines thick if the solar image were exactly centered, the X, Y offset of the sun's center with respect to the fiducial mark may easily be determined by comparing the actual count for each line scan with the ideal count of 15. This action is performed by the computer and consists of merely subtracting the actual count from 15 for each dimension. Once the position of the center of the sun has been determined, the computer performs the usual coordinate transformation to calculate the precise pointing angle to the sun with respect to the vehicle axis.

An alternate approach for locating the sun's center would be to scan the full lines X, Y=128 and separately count the number of video free spaces at the beginning and end of each scan. The difference between the two counts would then represent the sun's displacement in each direction. This technique may be preferable for use during extended space probes since it is invariant to symmetrical distortions or changes in the relative size of the solar disc, such as might be encountered at different times of the year or at different distances from the sun.

Before describing the logic section circuitry, one final image configuration for the solar mode should be considered. This is the case where the sun does not appear in the narrow field of view but its image in the wide field falls on one of the chord lines X, Y=19, 237. In such an event the logic will cycle through points 118, 120, 122 and 114 in FIGURE 6 and attempt to drive the wide field image to the center. The gimbal drive signals generated in this loop are comparatively small since the apparatus believes it is dealing with the narrow viewing field where incremental movements have a more pronounced effect. After several cycles, however, the image will be driven into the area enclosed by the four chord lines, the scan of the latter will not detect any video signals, and the logic will re-enter the sun acquisition mode. It may be appreciated then that the apparatus will indeed center the solar image for all possible configurations in the viewing fields.

The electronic circuitry required to perform the necessary logic functions for the stellar mode is shown in FIGURE 8, and consists essentially of an ordered assemblage of AND, OR, latch and counter circuits. These components are shown in block form in the interest of simplicity, and may have any number of specific configurations well known in the electronic arts. In order to more fully understand the operation of the circuitry shown in FIGURE 8 it may be helpful to periodically refer to the logic flow diagram of FIGURE 4 for purposes of correlation. The first situation that will be considered is that which arises when no ambiguous stars are encountered and only the reference star image is present within the wide viewing field.

The pulse output from the video shaper 58 of FIGURE 1 serves as one of the primary input signals for the stellar logic circuitry and is coupled to AND gate 126 over line 54. Assuming that all of the circuit elements have been reset to their initial operating states upon the receipt of a command signal from the computer, the video pulses pass through AND gate 126 to a three-bit binary star counter 128. The counter accumulates the number of video pulses detected during each scanning frame. At the end of each frame a pulse signal from line 48 in FIGURE 1 passes through the delay unit 46 and is applied to both the counter 128 and an associated decoder 130 over line 132. The count may be either 0, 1, 2 or 3 for the single star situation now being considered. The leading edge of the delayed frame pulse is used to strobe the decoder 130 which then raises an appropriate one of its output lines in response to the contents of the counter. The trailing edge of the frame pulse is used to reset the counter for the next scanning frame.

Since the vidicon tube sensitivity level at the beginning of each acquisition is set at a minimum, if the decoded star count is 0 or 1, representing only the presence of the fiducial mark, a pulse passes through OR gate 134 and AND gate 136 to increase the vidicon tube sensitivity by a single small step or increment. This increase in sensivity is accomplished by means of a target voltage counter 138 whose output is converted to analog form in the decoder 140 and applied to the target of the vidicon tube over line 73. As long as the star count per frame remains at 0 or 1 the vidicon target voltage and therefore the tube sensitivity is incrementally increased. Eventually, the sensitivity will become high enough so that any stars of magnitude plus 1.5 or greater will be detected. When this occurs the start count will advance to 2 or 3.

A star count of 2 or 3 will set latches L2 and L4 in the following manner. Latch L2 is set over line 142 through OR gate 144, and this latch in turn both inhibits AND gate 136, which prevents further sensitivity increases of the vidicon tube target, and conditions AND gate 146. Latch L4 is also set through OR gate 144, and this in turn conditions AND gate 148. The latter is responsive to the output from a 26 x 26 line decoder 149 and inhibits AND gate 126 whenever the scanning beam is in an area of 26 x 26 lines about the center of the tube face. The decoder 149 received its inputs from the deflection counters 32 and 34 over conduit 150. AND gate 148, in effect, blocks any video pulses that may be detected in the center area and corresponds to the initial blanking step represented at point 86 and FIGURE 4. In addition, latch L5 is set if the count is 2 and the latch L6 is set of the count is 3.

The vidicon tube now scans another frame and, by reason of the blanking enablement, counts only star pulses external to the center area of 26 x 26 lines. This will detect star images in either the wide or the narrow fields of view that are outside of their respective one-tenth radial center areas. It will be appreciated, however, that a given star will only be detected once during this scan since it cannot appear simultaneously in the unblanked areas of both viewing fields. In other words, if a star image is within the unblanked area of the narrow field it must necessarily be within the blanked area of the wide field, and if it lies in the unblanked area of the wide field it must be outside of the viewing angle of the narrow field. At the end of the frame the decoder 130 is strobed as before and a count or 0 or 1 is possible.

A star count of 0, corresponding to point 92 in FIGURE 4, indicates that the star images previously detected are within the blanked area and therefore a position readout to the computer is in order. This action occurs as follows. The star count pulse representing 0 passes through AND gate 146, which was previously conditioned by the setting of latch L2, and sets latch L7 through OR gate 152. Latch L7, in turn, conditions AND gates 154 and 156 and resets latch L4. The latter again inhibits AND gate 148 which causes the unblanking of the 26 x 26 line center area, while the conditioning of AND gate 124 effects a similar blanking of an 8 x 8 line area about the center of the tube face through the expedient of decoder 157. This second blanking corresponds to point 94 in FIGURE 4. The frame is now rescanned and the next video pulse detected external to the blanked 8 x 8 line center area passes through AND gate 126, over lines 158 and 160, and through the conditioned AND gate 156 to set latch L8. The output from the latter inhibits the deflection generator pulse shaper 38 through OR gate 50. This halts the X and Y deflection counters at the coordinate positions of the star image, and due to the simultaneous presence of a read command signal from latch L8 over line 70, the contents of the counters are then read out to the computer over line groups 66 and 68, shown in FIGURE 1. This terminates the action of the stellar mode logic network for the situation where no video pulses are detected during the initially blanked scanning frame.

If the star count during the initially blanked frame is 1, corresponding to point 88 in FIGURE 4 and indicating the presence of the reference star external to the 26 x 26 line center area, the camera head must be driven by the gimbals until the star image is within the blanked center area. Furthermore, since the star image may be in either the wide or the narrow field of view, it is also necessary to select the proper gimbal drive rate. These functions are implemented as follows.

When the star count during the initially blanked frame is 1, a pulse passes through either AND gate 162, previously conditioned by the setting of latch L5 if the first star count was 2, or through AND gate 164, previously conditioned by the setting of latch L6 if the first star count was 3. If the pulse passes through AND gate 162 it then continues through OR gate 166 to reset latch L12 and through OR gate 168 to set latch L11. Similarly, if the pulse passes through AND gate 164 it continues through OR gate 170 to set latch L12 and through OR gate 168 to set latch L11. Latch L12 is thus set or reset depending upon whether the initial star count was 2 or 3, and its purpose is to select either the slow clock source CP1 or the fast clock source CP2 to decrement the X and Y drive counters. The clock sources CP1 and CP2 have a ratio of approximately 1 to 10, corresponding to the ratio between the respective viewing field angles. When centering images in the wide field of view CP1 is employed and vice versa. The clock source selection is made in response to the condition of latch L12 by the four AND gates 172 and two OR gates 174, which essentially perform a decoding function for the latch.

The frame is now rescanned, corresponding to point 90 in FIGURE 4, and the first video pulse external to the still blanked 26 x 26 line center area passes over line 158 and through AND gate 176, previously conditioned by the setting of latch L11, to set latch L1. This will in turn stop the main deflection counters through OR gate 50, open AND gates 178 and 180 and condition AND gates 182. The opening of AND gates 178 and 180 permits the X and Y values stored in the halted deflection counters to be loaded into the X and Y drive counters 184 and 186, respectively. The conditioning of AND gates 182 sets two of latches L13–L16 in the following manner. If the value in the halted X deflection counter 32 is greater than 128, latch L13 is set while if the X value is less than 128 latch L14 is set. Similarly, if the Y deflection counter 34 contains a value greater than 128 latch L15 is set and if its value is less than 128 latch L16 is set. The choice of latch L13 or L14 determines whether the gimbals will be driven in a positive or negative direction with respect to the X axis and the same is true of latch L15 or L16 with respect to the Y axis. The gimbals begin to drive as soon as the latches L13–L16 are selectively set.

At this point the X and Y drive counters 184 and 186 contain the digital coordinates of the reference star image and latch L12 has been set or reset to select the proper clock source. If the count sequence during the unblanked and blanked scanning frames was 2–1 it is known that the situation shown in FIGURE 3*a* exists and the slow clock source CP1 is chosen since the star image is in the wide field of view. Conversely, if the count sequence was 3–1 the image configuration shown in FIGURE 3*b* exists and the fast clock source CP2 is selected since the star image lies in the narrow viewing field.

If the respective X and Y drive counters contain values other than zero their associated zero decoders 188 and 190 produce the remaining outputs needed to open the AND gates 172, which couples the selected clock source to both counters. The clock source now begins to simultaneously decrement each counter toward zero, and at the same time the gimbals are being driven to reposition the camera head 10 and center the star image within the narrow field of view. When the X drive counter 184 reaches zero this condition is sensed by decoder 188. The latter now resets latch L13 or L14, whichever one was previously set, to halt the gimbal drive along the X axis and also inhibits the two AND gates 172 that it controls, to stop the clock source flow to the X drive counter. In a similar manner, when the Y drive counter 186 is decremented to zero its decoder 190 resets latch L15 or L16 and inhibits the two AND gates 172 that it controls. When both the X and Y drive counters reach zero, as sensed by AND gate 192, latch L1 is reset which in turn removes the scan inhibiting signal from pulse shaper 38 in FIGURE 1. At the same time, the output from AND gate 192 resets the X and Y deflection counters to 0 over line 194, thus bringing the cycle back to point 84 in FIGURE 4. In this manner, pulse width modulated gimbal drive signals are produced wherein the width of the X axis signal, for example, is a direct function of both the distance between the tube center and the X coordinate of the reference star image and of the field in which the image is being viewed. As a possible alternative, if stepping motors are employed to drive the gimbals, the decrementing pulses for the drive counters could be supplied directly to the motors as drive pulses.

The gimbal driving operation described above will have centered the reference star image in the 26 x 26 line center area of the narrow viewing field and the star count during the next frame will therefore be 0. This will in turn initiate the readout operation described earlier through points 92, 94 and 96 in FIGURE 4 to terminate the acquisition sequence. If, for some reason, the star image has not been fully centered during the first gimbal driving operation, a star pulse will still be detected and the system will recycle through points 88, 90, 84 and 86 in FIGURE 4 until the image is completely centered and point 92 is reached.

Considering now the situation where an ambiguous star image is detected along with reference star image, the system must be capable of resolving the ambiguity and centering only the reference star while ignoring, or at least not responding to, the presence of the ambiguous star. As seen in FIGURES 5*a*, 5*b* and 5*c*, an initial count of 3 or 4 is possible when both the reference star and an ambiguous star are detected during an unblanked scanning frame. A count of 4 conclusively establishes the presence of an ambiguous star, but a count of 3 is indeterminate since it could represent the configuration of either FIGURE 3*b* or FIGURE 5*a*, and the former obtains without an ambiguous star.

If the first star count is 3, latches L2, L4 and L6 are set and have the same effects described earlier. If the first count is 4, latches L2 and L4 are set, and in addition, latch L3 is set which conditions AND gates 196 and 198. The second star count, with the 26 x 26 line center area blanked out due to the setting of latch L4, may now produce either 1 or 2 pulses. If a single video pulse is detected the configuration shown in FIGURE 5*c* is known to exist and a readout is in order. This is implemented as follows. The single pulse passes through the previously conditioned AND gate 196 and through OR gate 152 to set latch L7, which initiates the readout process in the manner described above. The pulse also passes through OR gate 200 to set latch L17. The latter conditions AND gate 202 whose other input over line 204 from the computer inhibits AND gate 176 during the detection of the ambiguous star pulse and prevents same from setting latch L1 and initiating a gimbal drive sequence.

The computer input to AND gate 202 functions to prevent the gimbal drive sequence from ever being performed on an ambiguous star, and thus amounts to the resolution of an ambiguity. This is made, as previously described, on the basis of known star configuration patterns stored in the memory section. The computer determines whether the reference star is in the upper/lower, right/left quadrant of the frame and raises line 204 only during those portions of the next scanning frame during which the beam is in the quadrant known to contain the reference star image. This conditioning action thus enables AND gate 176 only when the X and Y values of the scanning beam coordinates are greater than or less than 128 as dictated by the computer section, and thereby blocks the video pulse representing the ambiguous star from passing through the gate and inhibiting the scan. The computer input over line 204 is appropriately raised when the initial decision is made to track a reference star that is known to lie within 6° of an ambiguous star. This line is also appropriately raised whenever more than one video pulse is detected during the initially blanked scanning frame, corresponding to point 100 in FIGURE 4. In short, with the inner one-tenth radial area blanked out, only one video pulse may be detected for each star image, i.e. due to its presence in either the wide or the narrow viewing field. If two pulses are detected the computer therefore knows that an ambiguous star is also present.

The readout sequence for the situation where the counts from the unblanked and blanked scanning frames are 4–1 is the same as that described above in connection with the single star situation, except that the NOT 26 x 26 line decoder 206 now comes into play. This decoder is responsive to the inputs from the deflection counters over conduit 150 and acts to inhibit AND gate 156 whenever the scanning beam is external to the 26 x 26 line center area. This prevents the video pulse due to the ambiguous star from setting latch L8 and causing a readout.

If the center blanked star count is 2 following an initial count of 4, a pulse passes through conditioned AND gate 198 and OR gate 200 to set latch L17. This conditions AND gate 202 and enables the ambiguity resolution function in the manner described above. The pulse through AND gate 198 also passes through OR gates 170 and 168 to set latches L11 and L12. The setting of latch L11 conditions AND gate 176 so that, subject to the "permission" or "approval" of the ambiguity resolving AND gate 202, the next video pulse can set latch L1 and initiate the gimbal drive sequence as described above. The setting of latch L12 selects the fast clock source CP2 to decrement the drive counters since a 4–2 count sequence must represent the image configuration of FIGURE 5*b*. Under these conditions the reference star image is being detected in the narrow viewing field and the gimbals must therefore be driven through relatively small angles since each movement has a more pronounced effect. The fast clock source is therefore selected because it will decrement the counters more rapidly and thereby terminate the gimbal drive signals after a shorter period of time.

If the unblanked and blanked count sequence is 3–2, corresponding to the FIGURE 5*a* situation, latch L17 is set through AND gate 208 and OR gate 200 to effect the ambiguity resolution function, and latch L12 is reset through OR gate 166 to select the slow clock source CP1.

The remaining gimbal drive sequence and readout operation is the same as that described above in connection with the single star situation.

The electronic logic circuitry for implementing the solar mode of operation is shown in FIGURE 9, and once again consists of AND, OR, latch and counter circuits. Periodic reference should be made to the logic flow diagram of FIGURE 6 for more complete understanding of the solar mode circuitry, and it is to be understood that the stellar logic performs the initial acquisition functions corresponding to points 108, 110 and 112 in FIGURE 6.

At point 114 the chord line scan is implemented to determine whether or not the solar image has entered the narrow field of view. This action is performed by the four AND gates 260 which essentially decode the deflection counter outputs and issue signals only when the scanning beam is on one of the respective chord lines. The outputs from the AND gates 260 condition a further set of four AND gates 262 that are also supplied with the video input signals over line 54. The outputs from AND gates 262 thus represent the detection of video signals along the chord lines and serve to set the appropriate latches L1′–L4′. The latch conditions are in turn decoded by the fourteen AND gates **264*a–o*, which are strobbed by the delayed frame pulse at the end of each scanning frame. The connections between the latches L1′–L4′ and these AND gates implement the execution of an algorithm which prescribes the derivation of image centering signals based on the line scan outputs. Outputs from any one or more of the AND gates 264*b*–264*n* will thus produce appropriate ±X, Y gimbal drive signals through OR gates 266 to nominally center the solar image in the narrow field of view, and the logic will now cycle through points 114, 118, 120 and 122 in FIGURE 6. The lagging edge of the delayed frame pulse is used to reset latches L1′–L4′ over line 268** in preparation for another chord line scan.

If the sun has not entered the narrow field of view the latches L1′–L4′ will remain in their reset or zero conditions at the end of the frame. This corresponds to the image configuration of FIGURE 7*b* and point 116 in FIGURE 6, and AND gate **264*a*** will then produce an output upon strobbing which will reinitiate the acquisition sequence.

Once the solar image has been approximately centered in the narrow viewing field, as shown in FIGURE 7*a*, the latches L1′–L4′ will all be in their set or one conditions at the end of a scanning frame and an output will be produced by AND gate **642*o*. This signal sets latch L5′ which in turn inhibits AND gates 262, to thus terminate the chord line scans, and conditions AND gates 270 and 272. The vernier readout mode is now initiated on the next scanning frame and point 124** has been reached in FIGURE 6.

As the scanning beam sweeps back and forth across the tube face AND gate 270 now produces an output pulse each time the beam crosses the X=128 position, regardless of the Y value, as sensed over line 274. These pulses are accumulated in a five bit binary counter 276, and it will thus be appreciated that such a count represents the number of Y lines being scanned since only a single pulse will be produced for each Y line at the X=128 position. The first video pulse that occurs at the X=128 position is detected by AND gate 278 which then sets latch L6′. The latter in turn inhibits AND gate 270 over line 280 and conditions AND gate 282. The contents of counter 276 now represents the thickness of the annular ring between the upper edge of the frame and the solar image in the vertical or Y direction.

When the scanning beam reaches the Y=128 line AND gate 272 now produces an output pulse for each applied clock pulse until the detection of the first video pulse along this line by AND gate 284. The latter then sets latch L7′ which inhibits AND gate 272. These clock pulses are accumulated in counter 286 and represent the thickness of the annular ring between the lefthand edge of the frame and the solar images in the horizontal or X direction. The setting of latch L7′ also completes the input requirements for AND gate 282, which now provides a signal to the computer causing the latter to read out the counters 276 and 286 over line groups 288 and 290. Upon the receipt of this information the computer may now calculate the precise digital coordinates of the sun's geometric center, readout the gimbal angles, and perform the aforementioned coordinate transformation to accurately determine the pointing angle to the sun with respect to the vehicle axis.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A method of centering optical images focused on the face of a beam scanning tube comprising the ordered steps of:

(a) determining the X and Y coordinates of a desired image on the face of a beam scanning tube,
(b) generating separate X and Y drive signals having duration proportional to the respective differences between the determined image coordinates and the coordinates of the center of the tube face, and
(c) applying the generated signals to gimbal drive means for repositioning the tube to center the image.

2. A method of centering optical images as defined in claim 1 wherein the determination of the X and Y coordinates of a desired image on the face of a beam scanning tube recited in sub-paragraph (a) comprises the steps of:

(a) scanning the tube face,
(b) inhibiting the scanning beam when it encounters the image, and
(c) reading out the magnitudes of the X and Y beam deflection signals.

3. A method of centering optical images as defined in claim 1 wherein the determination of the X and Y coordinates of a desired image on the face of a beam scanning tube recited in sub-paragraph (a) comprises scanning the face of the tube with a predetermined center area of same blanked out, and wherein steps (a) and (b) are repeated until no image is detected in the unblanked area of the tube face.

4. A method of centering an optical image focused on the face of a beam scanning tube by superimposed wide and narrow angle viewing fields having substantially coincident axes, comprising the ordered steps of:
(a) determining the X and Y coordinates of the image in the wide viewing field,
(b) generating separate X and Y drive signals for repositioning the tube to center the image in the wide viewing field wherein the duration of each signal is proportional to the respective differences between the determined image coordinates and the coordinates of the center of the tube face,
(c) sensing output signals produced by the tube when the scanning beam is on selected lines on the face of the tube to detect the presence of the image in the narrow viewing field,
(d) repeating steps (a), (b) and (c) until the image is detected in the narrow viewing field.
(e) generating separate X and Y drive signals for repositioning the tube to center the image in the narrow viewing field in accordance with a predetermined algorithm and based on the output signals sensed when the scanning beam is on the selected lines, and
(f) repeating steps (c) and (e) until outputs are produced along all of the lines.

5. A method of centering an optical image as defined in claim 4 wherein the lines are chord lines of a circle, four such lines are scanned, and wherein they define an area whose boundaries are overlapped by the image when the latter is centered on the tube face.

6. A method of centering an image focused on the face of a beam scanning tube comprising the ordered steps of:
(a) scanning the tube face and sensing output signals produced when the scanning beam is on selected lines on the face of the tube to detect the presence of the image along the individual lines,
(b) generating separate X and Y drive signals for repositioning the tube to center the image in accordance with a predetermined algorithm and based on the output signals sensed when the scanning beam is on the selected lines, and
(c) repeating steps (a) and (b) until outputs are sensed along all of the lines.

7. A method of centering an image as defined in claim 6 wherein the lines are chord lines of a circle.

8. A method of centering an image as defined in claim 7 wherein outputs are sensed along four such chord lines and wherein they define an area whose boundaries are overlapped by the image when the latter is centered on the tube face.

9. A method of centering an optical image focused on the face of a beam scanning tube by superimposed wide and narrow angle viewing fields having substantially coincident axes, comprising the ordered steps of:
(a) scanning the face of the tube to detect the presence of an optical image in either one or both of the viewing fields,
(b) blanking out a predetermined center area on the tube face and rescanning same to detect the presence of the image in either the wide or the narrow viewing fields,
(c) determining the X and Y coordinates of the image on the face of the tube,
(d) generating separate X and Y drive signals for repositioning the tube to center the image wherein the duration of each signal is proportional to the respective differences between the determined image coordinates and the coordinates of the center of the tube face, and
(e) repeating steps (b), (c) and (d) until no image is detected in the unblanked area of the tube face.

10. A method of centering an optical image as defined in claim 9 wherein the determinations of the X and Y coordinates of the image on the face of the tube as recited in sub-paragraph (c) comprises the steps of:
(a) rescanning the tube face,
(b) inhibiting the scanning beam when it encounters the image, and
(c) reading out the magnitudes of the X and Y beam deflection signals.

11. A method of centering an optical image as defined in claim 9 wherein the initial scanning step recited in sub-paragraph (a) is repetitively performed at increasing levels of tube sensitivity until an optical image is detected.

12. A method of centering a desired optical image focused on the face of a beam scanning tube in the presence of an undesired optical image, comprising the ordered steps of:
(a) scanning the face of the tube to determine the X and Y coordinates of the desired and undesired images on the tube face,
(b) comparing the image pattern defined by the desired and undesired image coordinates with known identification criteria to determine which coordinates represent the desired image, and
(c) generating separate X and Y drive signals for repositioning the tube to center the desired image wherein the duration of each signal is proportional to the respective differences between the coordinates of the desired image and the cordinates of the center of the tube face.

13. An apparatus for centering a desired point image focused on the face of a beam scanning tube comprising:
(a) means for digitally scanning the tube face in repetitive frames,
(b) means for counting the number of output signals generated by the tube during each scanning frame due to the presence of point images on the face of the tube,
(c) means for inhibiting output signals generated when the scanning beam is in a predetermined center area of the tube face in response to an output signal count in excess of a predetermined number,
(d) means for reading out the digital X and Y coordinates of the desired image in response to the detection of same by the scanning beam in the uninhibited area of the tube face, and
(e) means for generating separate X and Y drive signals for repositioning the tube to move the desired image within the predetermined center area of the tube face wherein the duration of each signal is proportional to the respective differences between the read out digital coordinates of the desired image and the digital coordinates of the center of the tube face.

14. A star tracking apparatus adapted to center a desired star image focused on the face of a beam scanning tube and to read out the coordinates of the centered star image to a computer device, comprising:
(a) means for biaxially scanning the tube face in digitally defined incremental steps in repetitive frames,
(b) a counter for accumulating the number of output signals generated by the tube face during each scanning frame due to the presence of star images,
(c) first logic gate means for inhibiting output signals generated during subsequent scanning frames when the scanning beam is in predetermined center area of the tube face in response to an ouptut signal count in excess of a predetermined number,
(d) separate drive counters for each scanning axis,
(e) second logic gate means for inhibiting the scanning beam band reading out its digital coordinates to the respective drive counters in response to the detection of the desired star image external to the predetermined center area,
(f) four drive latches for issuing plus and minus biaxial drive signals for repositioning the scanning tube,
(g) third logic gate means for setting the appropriate drive latches to issue drive signals for repositioning the scanning tube to center the desired star image on the tube face in response to the detection of the desired star image, (h) fourth logic gate means for connecting an appropriate source of clock signals to the drive counters to decrement them in response to the detection of the desired star image, (i) means connecting the drive counters to the drive latches to re-set the latter and separately terminate the drive signals when each counter reaches a predetermined value, and (j) fifth logic gate means for disabling the first logic gate means and reading out the digital coordinates of the desired star image to the computer device in response to said image not being detected on the tube face external to the predetermined center area.

15. An apparatus for centering an image focused on the face of a beam scanning tube by a dual channel optical system including superimposed wide and narrow angle viewing fields having substantially coincident axes, comprising:

(a) means for digitally scanning the tube face to determine the biaxial coordinates of the image in the wide viewing field, (b) means for generating separate biaxial drive signals for repositioning the tube to center the image in the wide viewing field, said signals being modulated in accordance with the respective differences between the determined biaxial coordinates of the image and those of the center of the tube face, (c) means for sensing output signals produced by the tube when the scanning beams are on selected chord lines on the face of the tube to detect presence of the image in the narrow viewing field, and (d) means for generating separate biaxial drive signals for repositioning the tube to center the image in the narrow viewing field in accordance with a predetermined algorithm and based on the output signals sensed when the scanning beam is on the selected chord lines.

16. An apparatus for centering an image focused on the face of the beam scanning tube, comprising:

(a) means for biaxially scanning the tube face in a progressive back-and-forth pattern, (b) first logic gate means responsive to the instantaneous position of the scanning beam and to output signals produced by the tube face for producing output signals when the scanning beam is on selected lines on the face of the tube to thereby detect the presence of the image along the lines, and (c) second logic gate means for producing separate biaxial drive signals for repositioning the tube to center the image within an area defined by the lines in accordance with a predetermined algorithm and in response to the output signals produced by the first logic gate means.

17. An apparatus as defined in claim 16 wherein the area defined by the lines is a square.

18. A star tracking apparatus adapted to center a solar image focused on the face of a beam scanning tube and to read out position defining values of the centered image to a utilization device, comprising:

(a) means for biaxially scanning the tube face in digitally defined incremental steps in repetitive frames, (b) AND gate means responsive to the instantaneous digital coordinates of the scanning beam and to output signals produced by the tube face for producing four separate output signals to indicate the individual presence of the solar image along four selected chord lines on the face of the tube, (c) a logic network including AND and OR gates for producing plus and minus biaxial drive signals for repositioning the tube to center the solar image within an area defined by the four chord lines in accordance with a predetermined algorithm and in response to the output signals produced by the AND gate means, (d) an AND gate for producing an output signal in response to four concurrent output signals from the AND gate means to thereby detect the presence of the solar image along all four chord lines.

(e) means responsive to an output signal from the AND gate for deriving two separate series of pulses, each series representing the distance along a respective axial center line between the edge of the scanning frame and the edge of the solar image, (f) a pair of counters for separately accumulating each series of pulses, and (g) means for reading out the values contained in the counters to a utilization device.

References Cited

UNITED STATES PATENTS

| | | | |
|---|---|---|---|
| 3,057,953 | 10/1962 | Guerth | 250—203 X |
| 3,161,725 | 12/1964 | Hotham | 250—203 X |
| 3,114,859 | 12/1963 | Fathauer | 250—230 X |

JAMES W. LAWRENCE, *Primary Examiner.*

E. R. LA ROCHE, *Assistant Examiner.*

U.S. Cl. X.R.

178—6.8; 244—3.16